United States Patent [19]
Khaki et al.

[11] Patent Number: 6,067,569
[45] Date of Patent: May 23, 2000

[54] FAST-FORWARDING AND FILTERING OF NETWORK PACKETS IN A COMPUTER SYSTEM

[75] Inventors: Mohamed J. Khaki, Redmond; Gurdeep Singh Pall, Kirkland, both of Wash.

[73] Assignee: Microsoft Corporation, Redmond, Wash.

[21] Appl. No.: 08/891,020

[22] Filed: Jul. 10, 1997

[51] Int. Cl.[7] ............................. G06F 13/36; H04L 12/56
[52] U.S. Cl. ......................... 709/224; 709/106; 713/201
[58] Field of Search ........................ 370/60, 800, 85.13; 709/224, 227, 249, 226, 201, 106, 202, 206

[56] References Cited

U.S. PATENT DOCUMENTS

| | | | |
|---|---|---|---|
| 3,560,666 | 2/1997 | Shwed | 395/200.11 |
| 5,396,493 | 3/1995 | Sugiyama | 370/60 |
| 5,598,410 | 1/1997 | Stone | 395/800 |
| 5,619,648 | 4/1997 | Canale et al. | 395/200.1 |
| 5,644,571 | 7/1997 | Seaman | 370/85.13 |
| 5,802,320 | 9/1998 | Baehr et al. | 395/200.79 |
| 5,842,224 | 11/1998 | Fenner | 711/102 |
| 5,850,523 | 12/1998 | Gretta, Jr. | 395/200.54 |

FOREIGN PATENT DOCUMENTS

| | | | |
|---|---|---|---|
| WO 96/35988 | 11/1996 | European Pat. Off. | G06F 9/02 |
| WO 97/10662 | 3/1997 | European Pat. Off. | H04L 12/46 |

OTHER PUBLICATIONS

Janecek, Jan et al., "Effectiveness of Bridging in Multiprotocol Lans," *Microprocessing and Microprogramming*, vol. 37, Nos. 1 / 5, Amsterdam, NL, Jan. 1993, pp. 205–208.

Salamone, Salvatore, "This Router's Feature Set Spells Flexibility," *Data Communications*, vol. 22, No. 12, New York, U.S., Sep. 1993, pp. 45–46.

Tolly, Kevin et al., "IBM's Routexpander /2: Low Cost, Limited Access," *Data Communications International*, vol. 22, No. 5, Mar. 21, 1993, pp. 67–69.

*Primary Examiner*—Zarni Maung
*Assistant Examiner*—Khanh Quang Dinh
*Attorney, Agent, or Firm*—Leydig, Voit & Mayer, Ltd.

[57] ABSTRACT

A computer system facilitates concurrent filtering and fast-forwarding of network packets. The computer system includes a network card for interfacing with multiple computer networks, and the network adapter is able to fast-forward network packets that it receives to other network destinations without assistance from the main central processing in the computer system. A fast-forwarding cache is stored on the network card to facilitate such fast-forwarding. Network packets that are not fast-forwarded are processed by the main central processing of the computer system that may apply filtering to the network packets and route network packets accordingly. The main central processing unit provides routing information to the network card so that subsequently received network packets can be transmitted to the network destinations without intervention by the main central processing unit.

26 Claims, 11 Drawing Sheets

Fig.2

| Network Routing Header | | | Network Specific Data | | | |
|---|---|---|---|---|---|---|
| Network Destination | Network Source | Length | Length | IP Destination | IP Source | IP Protocol | Data |

FAST-FORWARDING CACHE

| Packet identifier | Network Addresses | Framing | NIC |
|---|---|---|---|
| | | | |
| | | | |
| | | | |

Fig. 5A

| Packet identifier | Network Addresses | Framing | NIC |
|---|---|---|---|
| <A2,B2,TCP,14,25> | B2,E7 | 802.3 | 3 |
| | | | |
| | | | |

Fig. 5B

| Packet identifier | Network Addresses | Framing | NIC |
|---|---|---|---|
| <A5,B2,TCP,14,25> | B2,E7 | 802.3 | 3 |
| <E1,B2,UDP,36,97> | B3,A5 | Ethernet | 1 |
| | | | |

Fig. 5C

| Packet identifier | Network Addresses | Framing | NIC |
|---|---|---|---|
| | | | |
| | | | |
| | | | |

Fig. 5D

FAST-FORWARDING AND FILTERING OF NETWORK PACKETS IN A COMPUTER SYSTEM

TECHNICAL FIELD

The present invention relates generally to data processing systems and more particularly to routing and filtering of network packets in a networked computer environment.

BACKGROUND OF THE INVENTION

Computer systems are often interconnected into vast computer networks. The computer systems connected on such networks communicate with each other by sending information through their electronic connections. The networks can be organized into various types of topologies. FIG. 1 illustrates one such topology. A network 100 comprises several local area networks 101–102 that are connected to a routing system 103. The computer systems of each local area network are connected to the communications link 101a–102a. When a source computer system on a local area network sends information to a destination computer system on the same local area network, the source computer system prepares a packet that includes the address of the destination computer system and transmits the packet on the communications link. The other computer systems on that same local area network (i.e., connected to the communications link) read the packet that was transmitted. The destination computer system detects that its address is included in that packet, and it processes the packet accordingly. Because of geographic and speed considerations, local area networks typically only include a limited number of computer systems that are in close proximity. For example, a company with offices in several locations may have a local area network at each location. However, the users of the computer systems may need to send packets to one another regardless to which of local area networks the users' computer systems are connected.

To allow packets to be sent from one local area network to another local area network, routing systems have been developed. A routing system is typically a dedicated special-purpose computer system to which each local area network is connected. The routing system maintains a cross-reference between computer system addresses and the local area network to which each computer system is connected. The routing system monitors the packets sent on each local area network to detect (using the cross-reference) when a computer system on one local area network is sending a packet to a computer system on another local area network. When the routing system detects such a packet, it forwards that packet onto the communications link for the local area network to which the destination computer system is connected. In this way, the routing system interconnects each of the local area networks into an overall network. Similar routing techniques are used to interconnect networks other than local area networks. For example, such routing techniques can be used on wide area networks and on the Internet.

Many different protocols have been developed to allow two computer systems to exchange information. If two computer systems support the same protocol, then they can exchange information. Certain protocols have been tailored to support the exchange of certain types of information efficiently. For example, the Internet protocol ("IP") was specified by the Department of Defense to facilitate the exchange of information between geographically separated computer systems. The IP specifies a destination in a packet format that identifies source and destination computer systems for data to exchange, but does not specify the format of the data itself. Several additional protocols may be used in conjunction with the IP to specify the format of the data. Once such additional protocol is the transmission control protocol ("TCP"). The TCP further specifies sub-protocols, such as the hyper-text transmission protocol ("HTTP") and the file transfer protocol ("FTP"), which specify the format of the data of the packet.

FIG. 2 is a diagram illustrating a typical packet sent on a local area network. The packet includes a network routing header followed by protocol specific data. The network routing header may include the destination computer address, the source computer address, and the length of the packet. The protocol specific data includes identification of the protocol and in the case of the IP includes the IP destination address, the IP source address, and the length of the IP portion of the packet. The data portion of the packet contains the sub-protocol identification plus other data of the packet.

Conventional routing systems often use a caching mechanism to speed the routing of the packets. When a packet is received, the routing system accesses its cross-reference of the local area networks and determines to which local area network the packet is to be routed. The routing system then stores that routing information in a cache. When subsequent packets are received, the routing system checks its cache and if the routing information for the packet is in the cache, then the routing system forwards the packet in accordance with the information in the cache. Although such a caching technique can help speed the routing of packets, such caching techniques are not used by routing systems when packet filtering is applied.

Packet filtering is often applied by a network administrator to restrict the type and timing of packets that are sent over the network. For example, a network administrator may want to restrict packets that are generated by a computer game from being transmitted over the network during normal business hours. A packet for a computer game may be identifiable, for example, by a TCP destination address, that indicates which application on the computer system identified by the IP destination address that is to receive the packet. Thus, the network administrator would configure the routing system to not forward any such packets during normal business hours. Also, the network administrator may want to filter out packets based on their source and destination addresses. For example, a company CEO may only want to receive packets from certain source computer systems and not every computer system on the network. When filtering is applied in conventional routing systems, caching is disabled and the slower procedure of checking the cross-reference information and filtering information is used for every packet. Thus, the processing not only of such filtered packets is slowed, but also of all packets is slowed because the cache is disabled.

SUMMARY OF THE INVENTION

In accordance with a first aspect of the present invention, a method of fast-forwarding a network packet is performed in a general-purpose computer system. "Fast-forwarding" refers to the network card performing the routing rather than a main central processing unit performing the routing. The computer system has a main central processing unit and a network card for interfacing the computer system with multiple networks. The network packet is received in the network card and is destined to a selected one of the networks. The received network packet is analyzed by the network card to determine whether the network packet should be fast-forwarded to its destination network by the network card or alternatively, routed by the main central processing unit. When it is determined that a network packet should be fast-forwarded to the destination network by the network card, it is fast-forwarded without intervention of the main central processing unit.

In accordance with another aspect of the present invention, a network card is provided for interfacing a computer system with multiple networks. The network card includes a fast-forwarding mechanism and multiple ports for interfacing with the multiple networks. The fast-forwarding mechanism fast-forwards a network packet that is received in the network card to a destination network without intervention by a main central processing unit of the computer system.

In accordance with a further aspect of the present invention, fast-forwarding and filtering may be concurrently active. In particular, a method for processing network packets that are received at a network card is practiced on a computer system. Fast-forwarding is active so that selected network packets that are received in the network card are fast-forwarded to at least one destination network by the network card without main central processing unit intervention. Filtering is concurrently active with the fast-forwarding so that the main central processing unit applies filtering to at least some of the network packets received in the network card to determine whether to accept or drop the network packets.

BRIEF DESCRIPTION OF THE DRAWINGS

FIG. 2 is a diagram illustrating a typical packet sent on a local area network.

FIGS. 5A–5D illustrate the contents of the fast-forwarding cache as packets are received and sent.

DETAILED DESCRIPTION OF THE INVENTION

The present invention provides a method and system for routing packets using a caching mechanism even when filtering is to be applied to some of the packets. The routing system of the present invention, also referred to as the fast-forwarding system, is implemented on a general-purpose computer system in a way that allows caching of routing information and in a way that minimizes the overhead placed on the main central processing unit of the computer system. Thus, the fast-forwarding system not only allows for caching when filtering, but also allows a general-purpose computer system to employ a caching mechanism.

The fast-forwarding system is described below relative to an embodiment that forwards and filters Internet protocol (IP) packets as well as Internet protocol extended (IPX) packets. Nevertheless, those skilled in the art will appreciate that the present invention is not limited to embodiments that operate solely with these types of network packets; rather, the present invention may be also practiced with other types of network packets.

Figure 1:
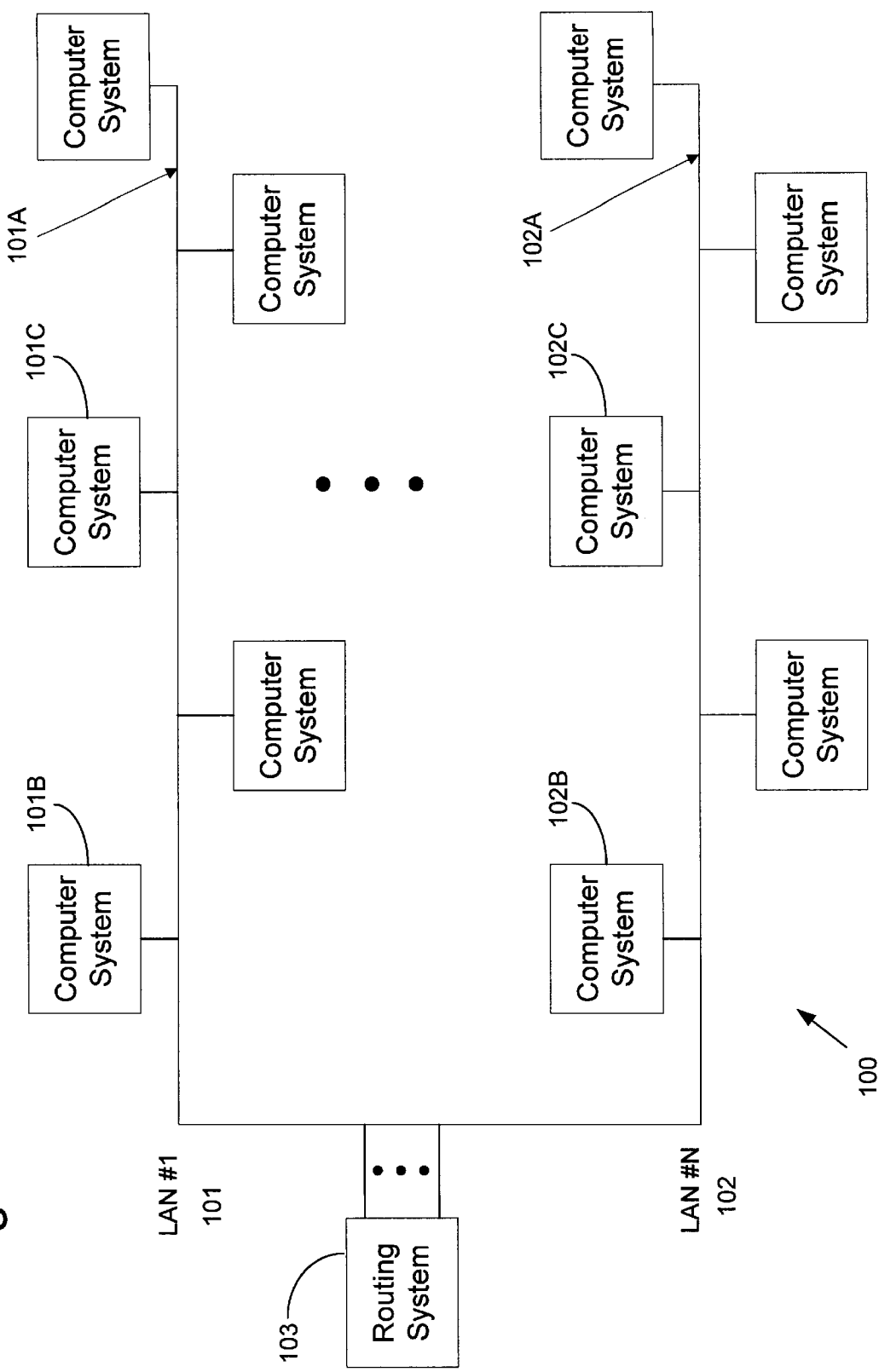
FIG. 1 illustrates one topology of interconnected networks.
Figure 3:
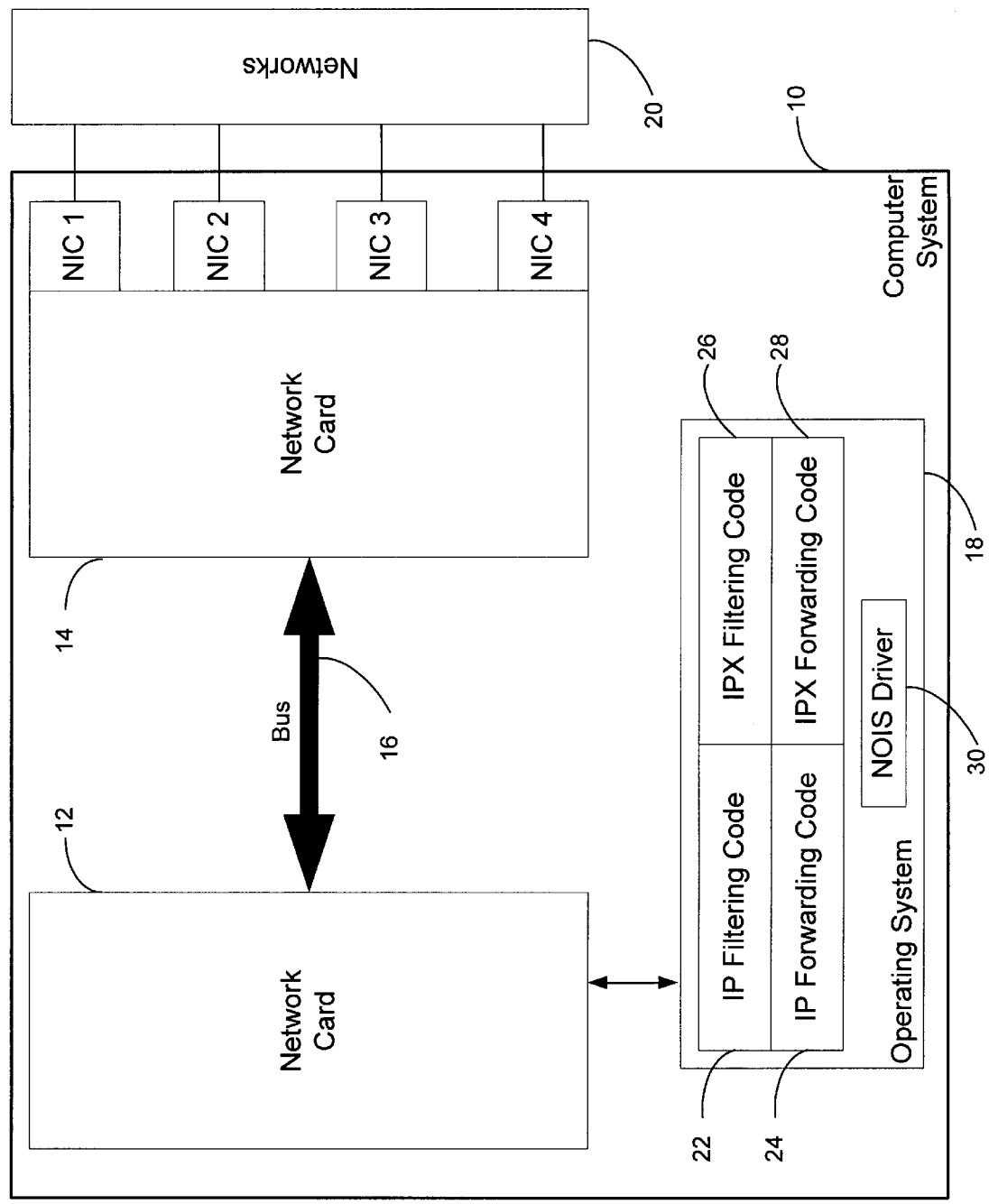
FIG. 3 is a block diagram of a general-purpose computer system 10 upon which the fast-forward system executes.

FIG. 3 is a block diagram of a general-purpose computer system 10 upon which the fast-forward system executes. The computer system is connected to a number of different computer networks 20. The computer system includes a central processing unit (CPU) 12 that is connected to a network card 14 via a bus 16. The network card includes multiple ports that are referred to as network interface connections ("NICs"). Each NIC is connected to a communications link of a network and can be used to send and receive packets on the network. Typical types of network cards include 802.3, DIX, TR, Fast Ethernet, and FDDI cards. The computer system runs an operating system 18, such as a network operating system. For purposes of the discussion below, it is assumed that the operating system is the Microsoft® Windows® NT network operating system sold by Microsoft Corporation of Redmond, Wash. The operating system includes a number of different components: an IP filtering component 22 for performing filtering of IP network packets and an IP forwarding component 24 for routing IP network packets. The operating system also includes an IPX filtering component 26 and an IPX forwarding component 28 for routing IPX network packets. The operating system also has a network driver interface specification (NDIS) driver component 30. The NDIS driver component provides an interface between the operating system and the network card. The operating system invokes services of the NDIS driver to send and receive network packets.

Figure 4:
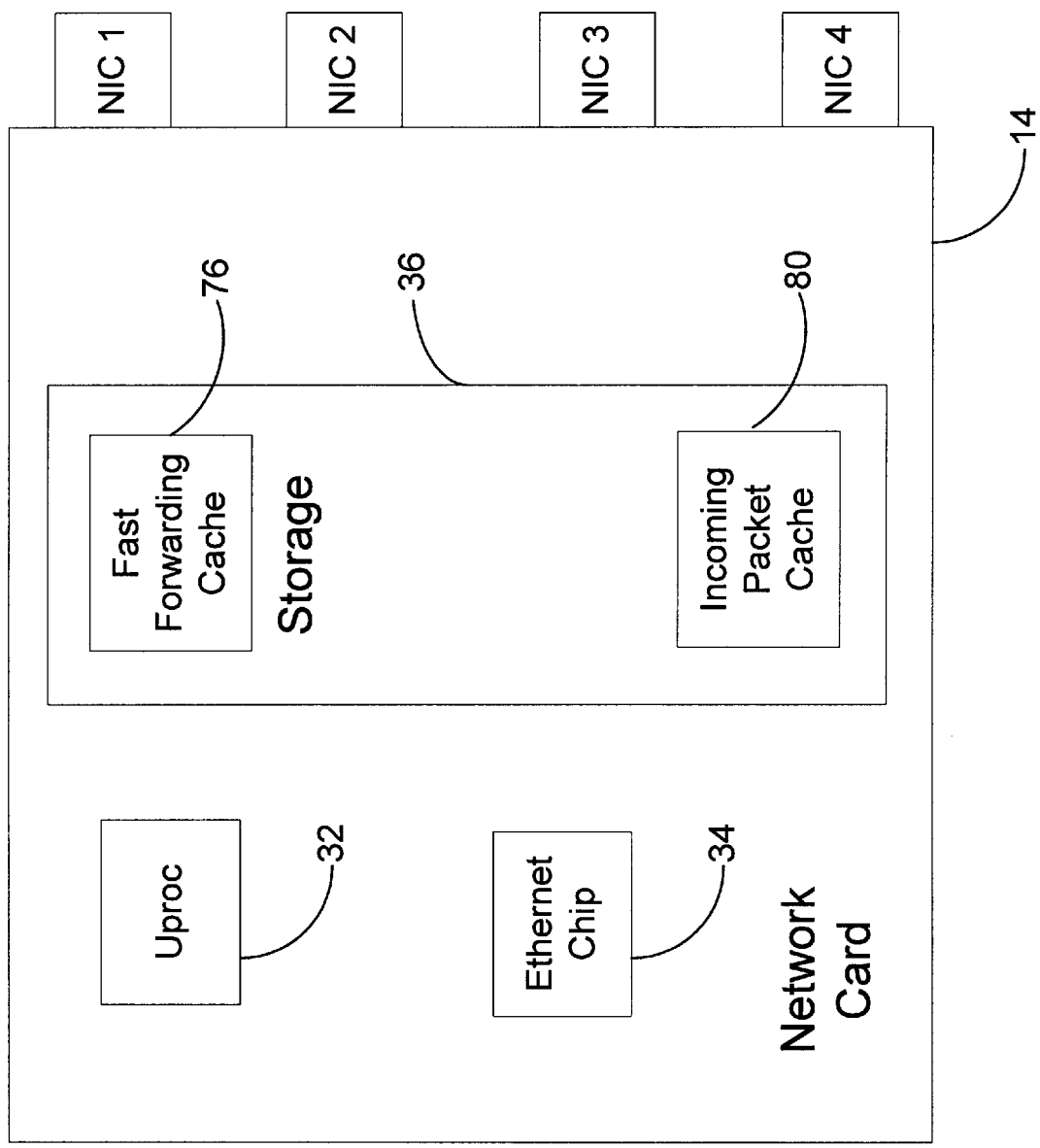
FIG. 4 is a block diagram that illustrates components of the network card in more detail.

FIG. 4 is a block diagram that illustrates components of the network card in more detail. The network card includes components for interfacing the routing system with a number of different computer networks. The network card includes a number of NICs. These NICs are designated as NIC1, NIC2, NIC3, and NIC4. The network card also includes a microprocessor 32, an Ethernet chip 34, and storage 36, such as random access memory (RAM). The storage contains a fast-forwarding cache 76 and an incoming packet cache 80. Although one fast-forwarding cache and one incoming packet cache are shown, those skilled in the art will appreciate that separate versions of these caches may be used for IP network packets and IPX network packets. The fast-forwarding cache holds information that facilitates the fast-forwarding of network packets by the network card. As will be described in more detail below, the fast-forwarding cache serves as a lookup table to which incoming network packets may be compared to determine whether they should be fast-forwarded by the network card.

In an alternative embodiment where multiple network cards are employed, the caches may be stored in shared memory on the computer system 10. When a network card receives a packet, it accesses the shared memory to access the fast-forwarding cache without interrupting the main central processing unit. Also, each network card has access to a mapping between the local area networks that are connected to each network card. In this way, each network card can route packets to local area networks connected to other network cards.

FIGS. 5A–5D illustrate the contents of the fast-forwarding cache as packets are received and sent. The cache contains a row for each unique packet identifier of the packets that are to be fast-forwarded. Each row contains a packet identifier that identifies packets to be fast-forwarded, a network address that indicates the destination computer system, a framing field that indicates the type of framing that is to be applied to the packet, and a NIC port number that identifies the port of the network card through which the packets with that packet identifier are to be transmitted. The packet identifier is a combination of fields from the packet that identifies packets that are to be fast-forwarded in the same manner. As shown by FIG. 5A, the fast-forwarding cache is initially empty. When the network card receives a packet, it checks the cache to determine whether a row with the corresponding packet identifier is in the cache. In this case, since the cache is empty, there are no rows and the network card forwards the packet via the NDIS driver to the operating system. The network card also stores the packet in the incoming packet cache. When the operating system receives the packet, it determines whether any filtering applies and whether the packet needs to be forwarded onto another network. If no filtering applies and the packet is to be forwarded, then the operating system returns the packet to the network card via the NDIS driver for forwarding on the appropriate local area network. When the network card receives the packet, it stores an entry in the fast-forwarding cache as shown in FIG. 5B. In this case, the packet identifier "<A5, B2, TCP, 14, 25>" indicates that the IP source address is "A5," the IP destination is address "B2," the protocol is "TCP," the TCP source port is 14, and the TCP destination port is 25. The network address to which the packets with that package identifier are to be routed is "E7." The outgoing packet is to be framed according to 802.3 protocol and the packets should be routed through NIC port number 3. The network card then retrieves the packet from the incoming packet cache, prepares the packet for routing, and transmits the packet via the NIC port. When the network card receives the next packet with that packet identifier, it generates the packet identifier and determines whether a row with that packet identifier is in the fast-forward cache. If so, the network card, retrieves the row and updates the network address for the packet, adjusts the framing according to the 802.3 protocol, and transmits the packet onto NIC port number 3. As part of processing, the network card also decrements the time-to-live flag of the packet. The time-to-live flag is initially set to the number of times the packet can be routed on its way to the destination. If the time-to-live flag drops below zero, then the packet cannot be routed again and the network card drops the packet by not forwarding it. Also, if the checksum in the packet is incorrect, the network card also drops the packet.

Eventually, the network card will receive a packet with a different packet identification. The network card generates a packet identifier for that packet and determines that there is no row in the cache for that packet identifier. The network card then forwards that packet to the operating system. The operating system applies the appropriate filtering. In this case, the operating system determines that the packet should not be forwarded. Thus, the operating system does not forward the packet to the network card. The network card thus does not update the cache to contain a row for the packet identifier. Thus, when the next packet is received with that packet identifier, the network card generates the packet identifier and determines that there is no row in the cache for that packet identifier and sends the packet to the operating system. FIG. 5C illustrates the contents of the cache after a packet for another packet has been received and the fast-forwarding cache updated for that packet. In this case, the packet identifier is "<E1, B2, UDP, 36, 97>," the network cache address is "A5," the framing is Ethernet, and the NIC port address is 1. Occasionally, the operating system may receive requests to change its routing information. For example, a computer system may be removed from one local area network and installed in another local area network. In such a case, packets routed to that computer system would need to be transmitted through a different NIC port. When the operating system updates its routing information, it also instructs the network card to flush its fast-forwarding cache because the information in the cache may no longer be valid. The network card flushes its cache by removing all entries from its cache as shown in FIG. 5D.

In certain situations, the operating system may be updating specific information that may not affect the whole fast-forwarding cache. In such a situation, the operating system can instruct the network card to flush only the portion of its fast-forwarding cache relating to the updated portion of the routing information. For example, the operating system may maintain a mapping of IP addresses to Ethernet addresses. If a packet is not sent to a certain Ethernet address for a certain time period, the operating system may delete the mappings relating to that Ethernet address and instruct the network card to flush only portions of the fast-forwarding cache relating to that Ethernet address. In this way, the network card can continue fast-forwarding packets based on the portions of the cache not flushed.

Figure 6A:
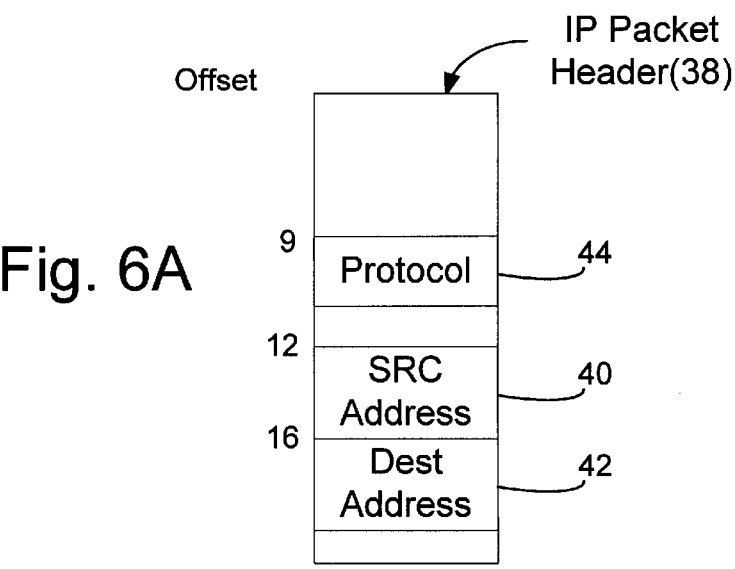
FIGS. 6A–6E depict the fields in a number of different types of packets.
Figure 6B:
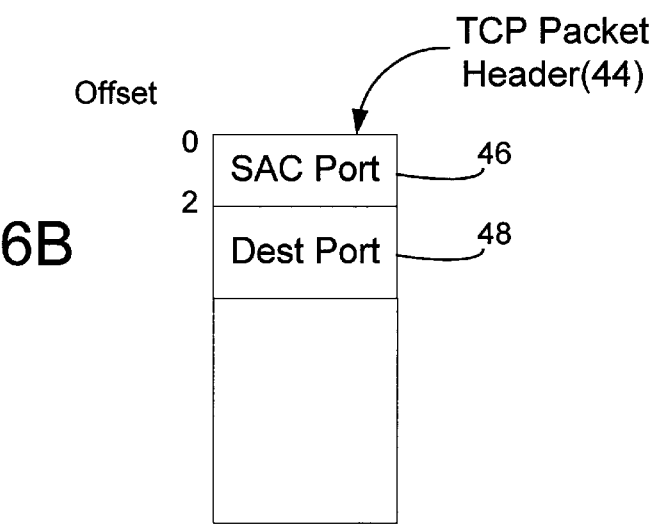
Figure 6C:
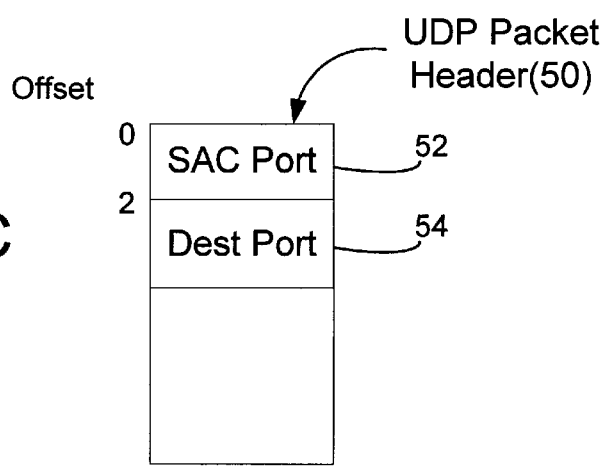
Figure 6D:
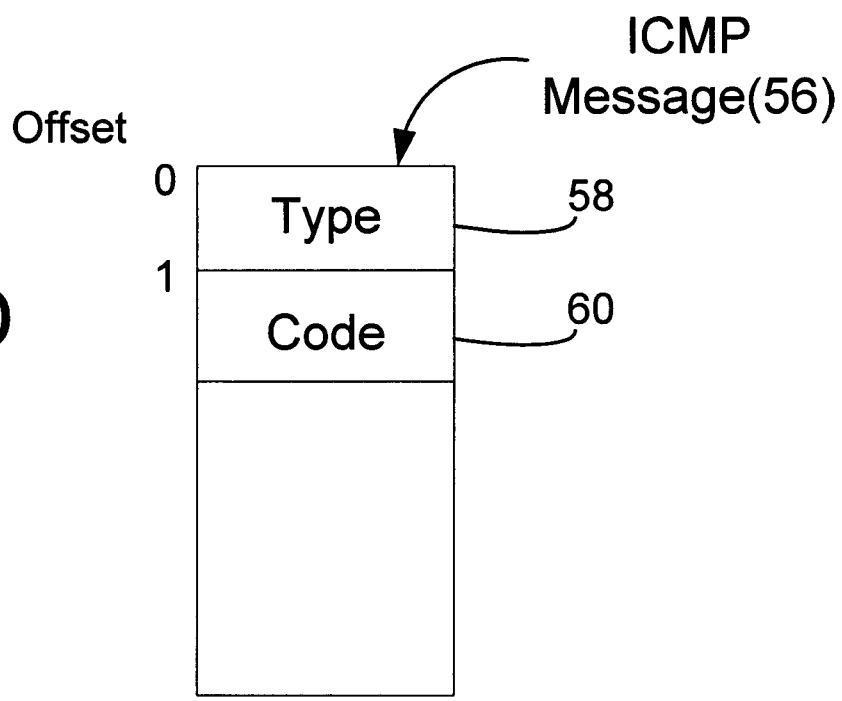
Figure 6E:
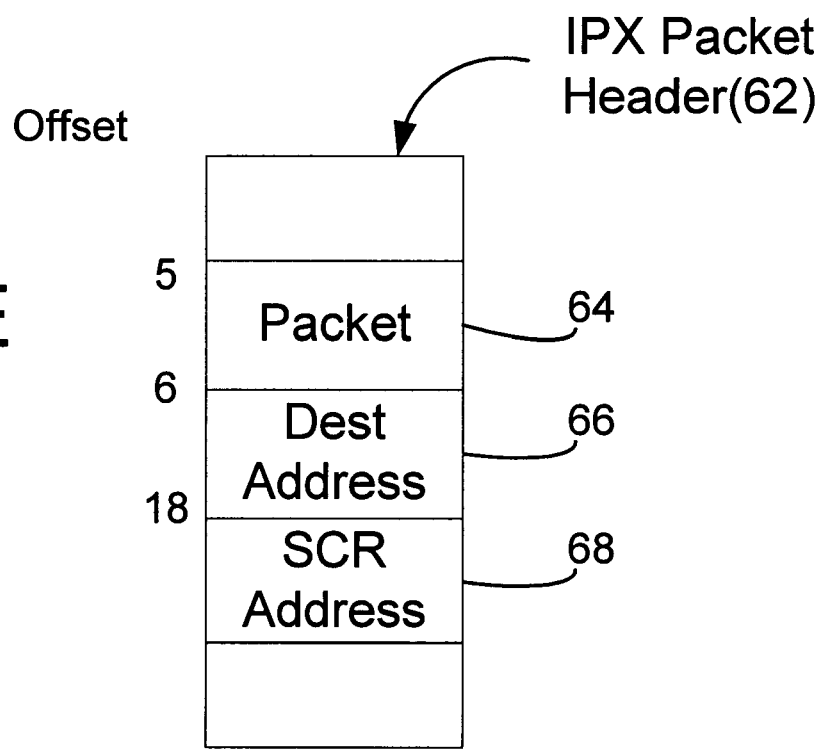

FIGS. 6A–6E depict the relevant fields of a number of different types of packets. FIG. 6A depicts the fields that are used in fast-forwarding from an IP packet header 38. At offset 12 within the IP packet header 38 is a source address field 40 that holds an address for the source from which the packet originated. At offset 16 is a destination address field 42 that holds an address for the destination to which the packet is destined. The protocol field 44 is at offset 9 within the IP packet header 38 and indicates a protocol, such as TCP. FIG. 6B shows fields of a TCP packet header 44. A source port field 46 is found at offset 0 and holds a value that identifies the source port of the application that sent the packet. A destination port field 48 is found at offset 2 and holds a value that identifies the destination port of the application to which the packet is sent. FIG. 6C depicts a portion of a UDP packet header 50 that includes a source port field 52 at offset 0 and a destination port field 54 at offset 2. FIG. 6D depicts an ICMP packet 56 that holds a type field 58 at offset 0 and a code field 60 at offset 1. Lastly, FIG. 6E depicts an IPX packet header 62 that has a destination address field 66 at offset, source address field 68 at offset 18, and packet field 64 at offset 5.

Sometimes a packet itself may be subdivided into packet fragments, that are transmitted individually. When the packet fragments are received, they can be reassembled into the packet. However, packet fragments do not contain all the information of the packet identifier that is used to uniquely identify information in the fast-forwarding cache. Rather, a packet fragment contains a fragmented flag and an identifier field. When a packet is fragmented, a unique packet identifier is placed in each packet fragment and the fragmented flag is set. When a fragmented packet is received, the network card first checks if the identifier is present in a fragment cache. If it is the network card fast-forwards the packet, else it passes the fragment to the operating system and adds it to the fragment cache when it is transmitted. In this way, the network card can fast-forward packet fragments.

Figure 7:
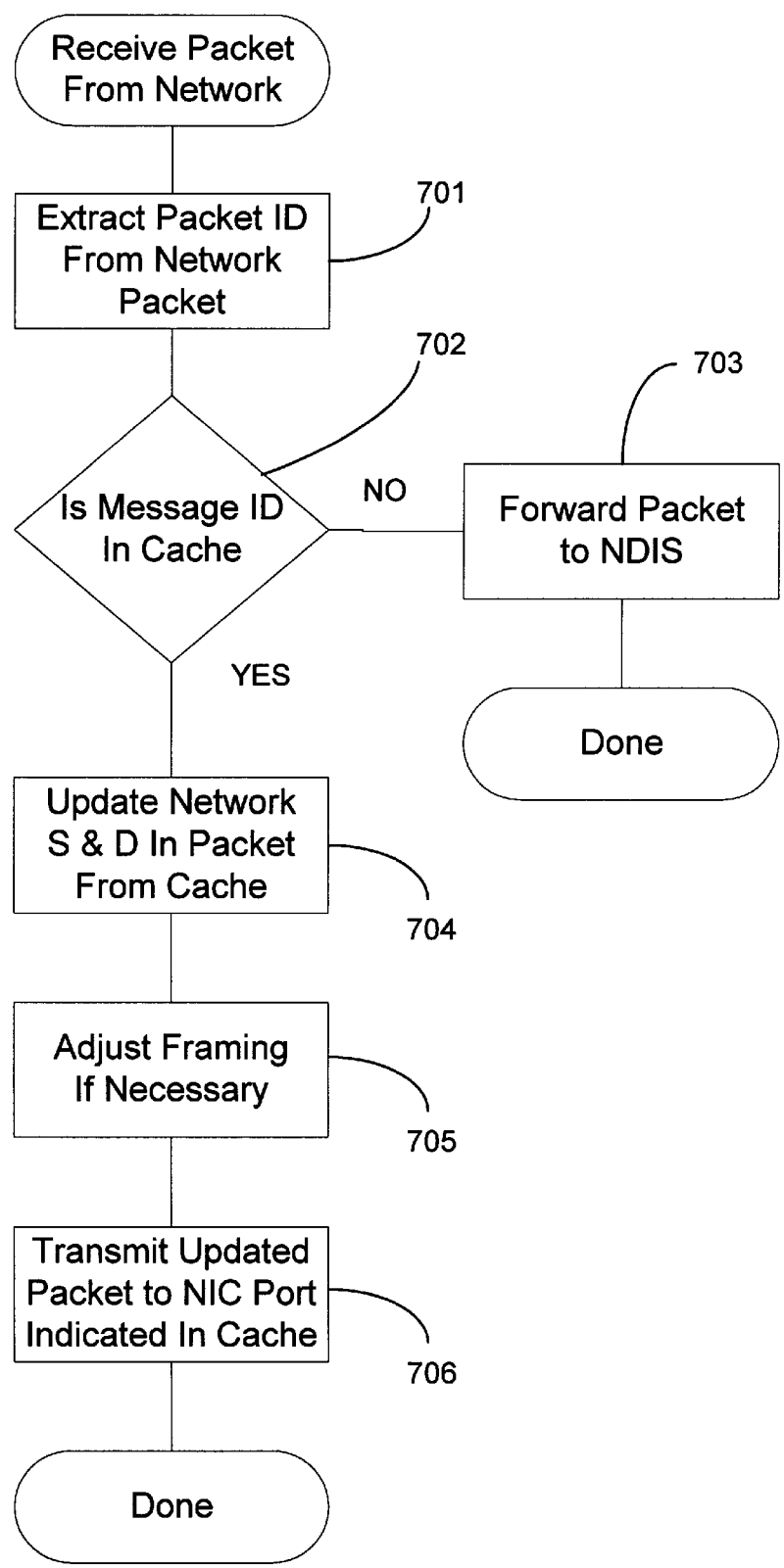
FIG. 7 is a flow diagram of the routine of the network card that receives a packet from the network.

FIGS. 7–10 are flow diagrams illustrating the processing performed by the network card and the operating system when processing packets. FIG. 7 is a flow diagram of the routine of the network card that receives a packet from the network. This routine receives packets and determines whether fast-forwarding information for the packet is in the fast-forwarding cache. If fast-forwarding information is in the cache, the routine fast-forwards the packet, otherwise the routine sends the packet to the NDIS driver. In step 701, the routine extracts the packet identifier from the received network packet. In step 702, if a row in the fast-forwarding cache matches the extracted packet identifier, then the routine continues at step 704, else the routine continues at step 703. In step 703, the routine stores the packet in the incoming cache and forwards the packet to the NDIS driver which forwards the packet to is the operating system and completes. In steps 704–706, the routine fast-forwards the packet. In step 704, the routine updates the network source and destination address in the packet with the information from the fast-forwarding cache. In step 705, the routine adjusts the framing of the packet, if necessary. In step 706, the routine transmits the updated package to the NIC port indicated in the cache and completes. In addition, the routine updates the time-to-live field in the packet. If the value of the time-to-live field drops to below zero, then the routine drops the packet. The routine also updates the checksum of the packet as appropriate. For example, the routine recomputes the IP header checksum based on the updated value of the time-to-live field. If any option fields in the packet are set, then the routine sends the packet to the operating system rather than fast-forwarding the packet. The options fields indicate that further processing is needed before the packet can be forwarded. If for any reason the network card cannot process the packet, it sends the packet to the operating system for further processing. For example, if the IP header checksum is not correct or the IP header time-to-live is zero, the network card forwards the packet to the operating system.

Figure 8:
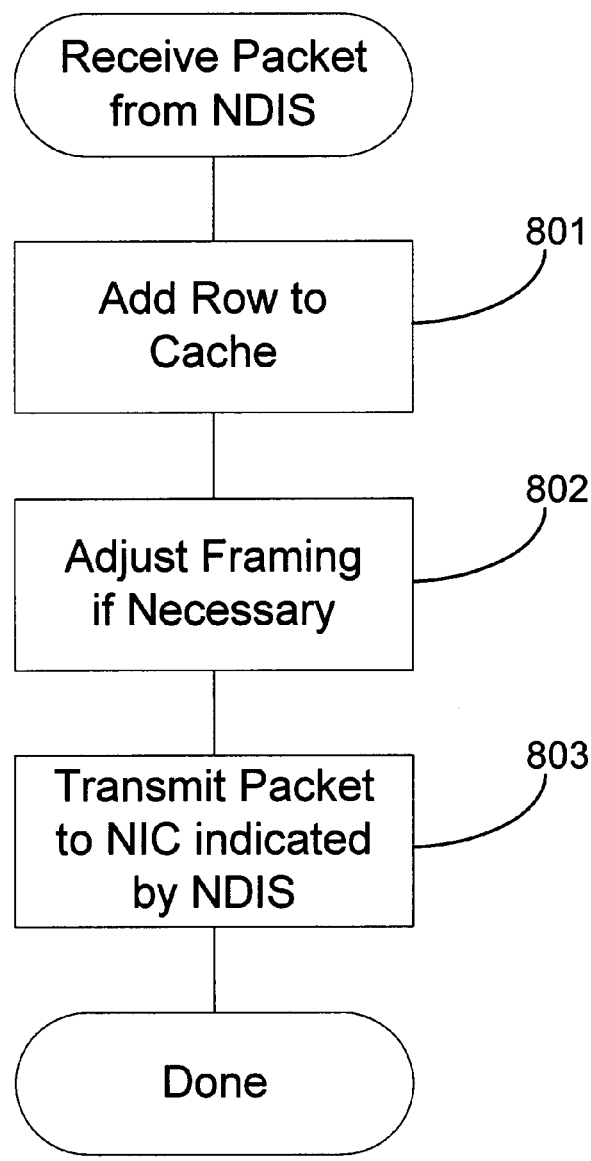
FIG. 8 is a flow diagram of a routine for the network card to receive a packet from the NDIS driver.

FIG. 8 is a flow diagram of a routine for the network card to receive a packet from the NDIS driver. When the routine receives a packet from the NDIS driver, it updates the fast-forwarding cache accordingly and forwards the packet. In step 801, the routine creates a row and adds the row to the fast-forwarding cache. In step 802, the routine retrieves the packet from the incoming packet cache and adjusts the framing of the packet as necessary. In step 803, the routine transmits the packet to the NIC port indicated by the row and completes.

Figure 9:
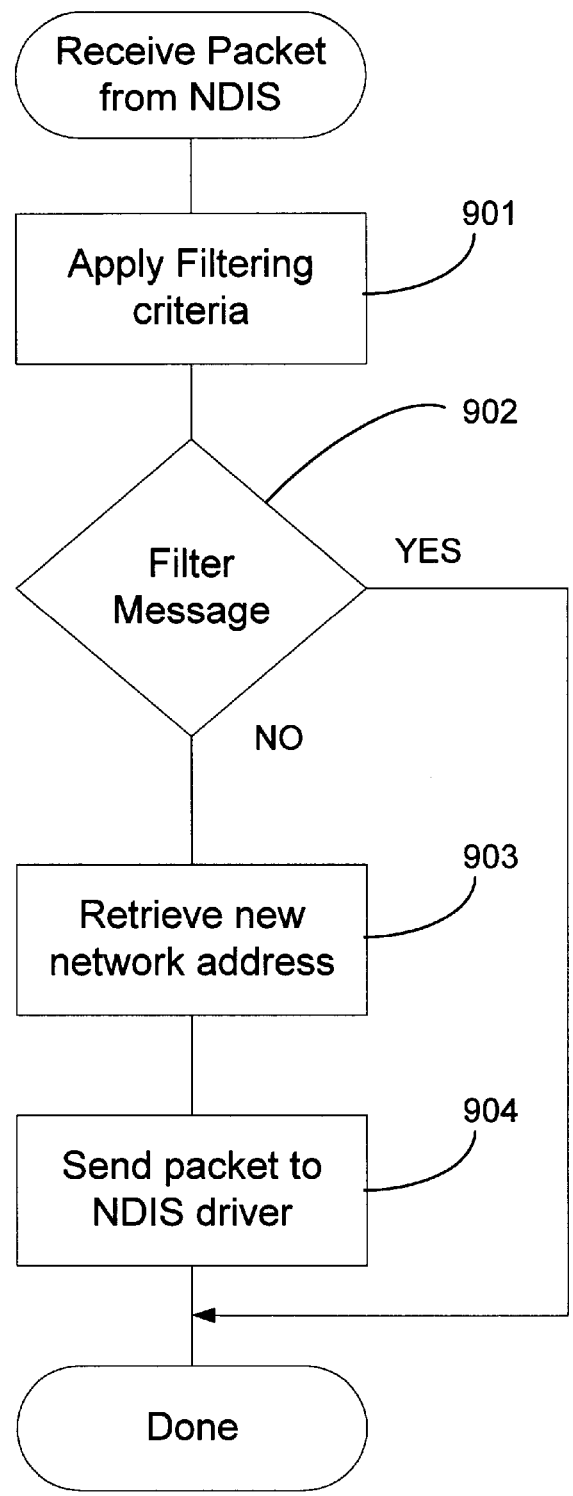
FIG. 9 is a flow diagram of a routine of the operating systems to process a packet that is received from the NDIS driver.

FIG. 9 is a flow diagram of a routine of the operating systems to process a packet that is received from the NDIS driver. This routine checks its various filtering criteria to determine whether to drop a packet. If the packet is to be dropped, then the routine suppresses the forwarding of the packet to the network card. In step 901, the routine applies the various filtering criteria to the received packet. The filtering criteria can include dropping packets that are sent to a certain IP destination address or dropping packets that are directed to a certain TCP destination port. The filtering information is typically maintained by a network administrator. In step 902, if the received packet has been filtered out, then the routine completes, else the routine continues at step 903. By completing when the packet is filtered out, the routine effects the dropping of the packet. In step 903, the routine retrieves the new network source and destination addresses for the packet from the routing tables. In step 905, the routine sends the packet to the NDIS driver which forwards the packet to the network card. The routine is then done.

Figure 10:
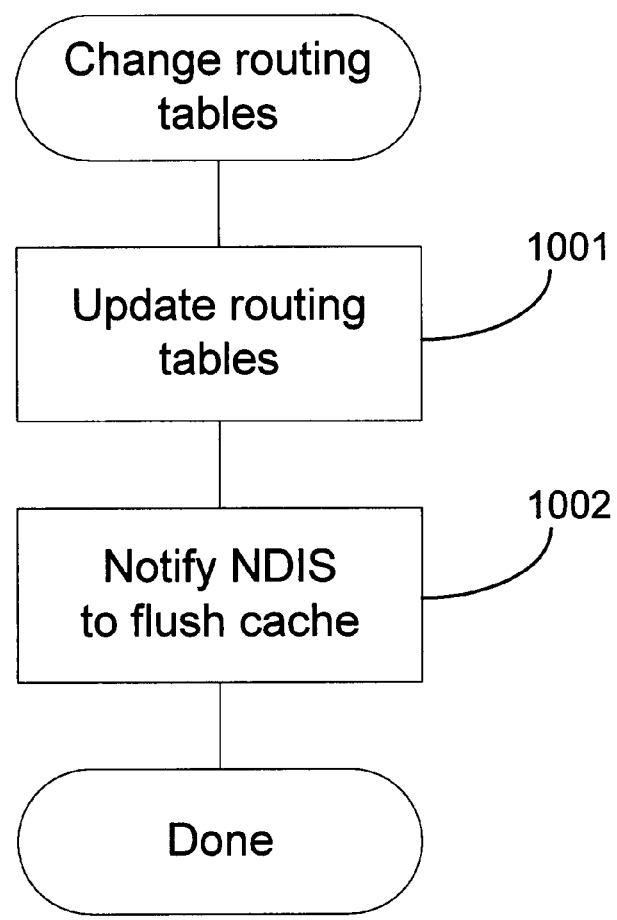
FIG. 10 is a flow diagram of an operating system routine to update the routing tables.

FIG. 10 is a flow diagram of an operating system routine to update the routing tables. The routine receives new routing instructions, updates its routing tables, and notifies the NDIS driver to flush the fast-forwarding cache. The NDIS driver in turn notifies the network card to flush its fast-forwarding cache.

While the present invention has been described with reference to a preferred embodiment thereof, those skilled in the art will appreciate that various changes of form and detail may be made without departing from the intended scope of the present invention as defined in the appended claims. For example, the fast-forwarding techniques of the present invention can alternatively be implemented by the NDIS driver rather than by the network card. With such an implementation, standard network cards can be used without modification. The NDIS driver would maintain the fast-forwarding cache and control the fast-forwarding of packets. When the NDIS driver receives a packet from a network card, it would check its cache to determine whether the packet should be fast-forwarded. If the packet is to be fast-forwarded, the NDIS driver would direct the appropriate network card to forward the packet. Otherwise, the NDIS driver sends the packet to the operating system. Also, although the techniques of the invention are described as being implemented as software executing on a network card with a processor, the techniques can be hardwired using logic circuits rather than software. Also, different fields from the packets may be selected to form a packet identifier for packets that are related, that is, to be fast-forwarded in the same way.

We claim:

1. A method in a computer system for forwarding packets of data from a source network to a destination network, each packet being part of a message, the computer system having a main central processing unit connected via a bus to a network card, the network card being connected to the source and destination networks, the network card having a cache memory, the computer system having an operating system with instructions that are executed by main central processing unit, the method comprising:

under control of the network card,
receiving a packet from the source network;
determining whether the cache memory contains routing information for the packet;
when the cache memory contains such routing information, transmitting the received packet on the destination network in accordance with the routing information; and
when the cache memory does not contain such routing information, sending the received packet to the operating system;

under control of the operating system,
receiving the sent packet;
determining whether the received packet should be dropped based on filtering information; and
when the received packet should not be dropped,
retrieving routing information that indicates that the receive packet should be transmitted on the destination network; and
sending the routing information to the network card; and under control of the network card,
receiving the sent routing information;
storing the received routing information in the memory cache so that subsequent packets can be transmitted onto the destination network without sending the subsequent packets to the operating system; and transmitting the received packet on the destination network in accordance with the routing information wherein packets with the same packet identifiers can be forwarded on the destination network without processing by the operating system, while packets with other packet identifiers can be dropped based on the filtering criteria processing of the operating system.

2. The method of claim 1 including:
under control of the operating system,
receiving an update to the routing information; and
in response to receiving the update, notifying the network card to flush its cache memory.

3. The method of claim 1 wherein the computer system includes a plurality of network cards and the cache memory is accessible by each network card without interrupting the main central processing unit.

4. A method in a general-purpose computer system of forwarding a network packet from a source network to destination network, the computer system having a main central processing unit and a network card, the network card being connected to the source and destination networks, the method comprising:
receiving the network packet at the network card, the network packet having a destination address;
analyzing the received network packet to determine whether the network packet should be forwarded to its destination by the network card or forwarded to the main central processing unit;
when it is determined that the network packet should be forwarded to its destination by the network card, transmitting the network packet to the destination network by the network card without intervention by the main central processing unit; and
when it is determined that the network packet should be forwarded to the main central processing unit, providing the received network packet to the main central processing unit for further processing.

5. The method of claim 4 wherein the network card is a multiport network card and wherein the network packet is received at a first port and transmitted through a second port.

6. The method of claim 4 wherein the computer system further comprises a bus through which the main control processing unit and network card communicate and wherein the transmitting of the network packet is accomplished without sending the network packet over the bus.

7. The method of claim 4, further comprising maintaining a fast-forwarding cache on the network card for use when analyzing, the fast-forward cache having routing information which is accessed to determine which network packets are to be transmitted by the network card without intervention by the main central processing unit.

8. The method of claim 4 wherein the main central processing unit applies filtering to the network packet to determine whether to accept or drop the network packet and wherein such filtering is enabled while the transmitting by the network card without intervention by the main processing unit is also enabled.

9. In a computer system having a main central processing unit and a network card for interfacing the computer system with multiple networks, a method of processing network packets that are received at the network card, comprising:
having fast-forwarding active so that selected network packets that are received at the network card are fast-forwarded to at least one destination network by the network card without main central processing intervention; and
concurrently having filtering active so that the main central processing unit applies filtering to at least some of the network packets received at the network card to determine whether to accept or drop the network packets.

10. The method of claim 9 wherein at least some of the network packets are Internet protocol (IP) network packets.

11. The method of claim 9 wherein the main central processing unit provides the network card with routing information for fast-forwarding the selected network packets.

12. The method of claim 9 wherein the network card provides to the main central processing unit those network packets that are not to be fast-forwarded.

13. A computer-readable medium containing instructions for causing a general-purpose computer system to forward a network packet from a source network to destination network, the computer system having a main central processing unit and a network card, the network card being connected to the source and destination networks by:
receiving the network packet at the network card, the network packet having a destination address;
analyzing the received network packet to determine whether the network packet should be forwarded to its destination by the network card or forwarded to the main central processing unit;
when it is determined that the network packet should be forwarded to its destination by the network card, transmitting the network packet to the destination network by the network card without intervention by the main central processing unit; and
when it is determined that the network packet should be forwarded to the main central processing unit, providing the received network packet to the main central processing unit to determine whether the network packet should be dropped or forwarded to the destination.

14. The computer-readable medium of claim 13 wherein the network card is a multiport network card and wherein the network packet is received at a first port and transmitted through a second port.

15. The computer-readable medium of claim 13 wherein the computer system further comprises a bus through which the main control processing unit and network card communicate and wherein the transmitting of the network packet is accomplished without sending the network packet over the bus.

16. The computer-readable medium of claim 13, further comprising maintaining a fast-forwarding cache on the network card for use when analyzing, the fast-forward cache having routing information which is accessed to determine which network packets are to be transmitted by the network card without intervention by the main central processing unit.

17. The computer-readable medium of claim 13 wherein the main central processing unit applies filtering to the network packet to determine whether to accept or drop the network packet and wherein such filtering while the transmitting by the network card without intervention by the main processing unit is enabled.

18. A computer system having a main central processing unit and a network card for interfacing the computer system with multiple networks, the computer system for processing network packets that are received at the network card in which fast-forwarding is active so that selected network packets that are received at the network card are fast-forwarded to at least one destination network by the network card without main central processing intervention and in which filtering is concurrently active so that the main central processing unit applies filtering to at least some of the network packets received at the network card to determine whether to accept or drop the network packets.

19. The system of claim 18 wherein at least some of the network packets are Internet protocol (IP) network packets.

20. The system of claim 18 wherein the main central processor provides the network card with routing information for fast-forwarding the selected network packets.

21. The system of claim 18 wherein the network card provides to the main central processing unit, those network packets that are not to be fastforwarded.

22. A method in a general-purpose computer system of forwarding a network packet from a source network to destination network, the computer system having an operating system, a network driver, and a network card, the network card being connected to the source and destination networks, the method comprising:

under control of the network card,
receiving the network packet having a destination address from the source network; and
forwarding the received network packet to the network driver;

under control of the network driver,
analyzing the received network packet to determine whether the network packet should be forwarded to its destination by the network card or provided to the operating system;
when it is determined that the network packet should be forwarded to its destination by the network card, instructing the network card to transmit the network packet to the destination network; and
when it is determined that the network packet should be provided to the operating system, providing the received network packet to the operating system for further processing; and under control of the network card,
when instructed to transmit the received packet, transmitting the network packet to the destination network so that a decision to forward a network packet is made by the network driver.

23. The method of claim 22 wherein computer system has a plurality of network cards and wherein the network packet is received at a first network card and transmitted through a second network card.

24. The method of claim 22, further comprising maintaining a fast-forwarding cache by the network driver for use when analyzing, the fastforward cache having routing information which is accessed to determine which network packets are to be transmitted by the network card without intervention from the operating system.

25. The method of claim 22 wherein the operating system applies filtering to the network packet to determine whether to accept or drop the network packet and wherein such filtering is enabled while the network packets are fast-forwarded by the network driver without intervention by the operating system.

26. The method of claim 22 wherein the network driver is an NDIS driver.

* * * * *

UNITED STATES PATENT AND TRADEMARK OFFICE
CERTIFICATE OF CORRECTION

PATENT NO. : 6,067,569
DATED : May 23, 2000
INVENTOR(S) : Khaki et al

It is certified that errors appear in the above-identified patent and that said Letters Patent is hereby corrected as shown below:

On The Title Page:

In section [56] References Cited: "3,560,666 2/1997 Shwed" should read --"5,606,668 2/1997 Shwed--.

In The Drawings:

In Fig. 3, element 12: "Network Card" should read --CPU--.

In The Specification:

In Column 7, line 16: "to is the" should read --to the--.

In The Claims:

In Claim 7, Column 11, line 13: "fastforwarded" should read --fast-forwarded--.

In Claim 24, Column 12, line 19: "fastforward" should read --fast-forward--.

Signed and Sealed this

Twenty-fourth Day of April, 2001

*Attest:*

NICHOLAS P. GODICI

*Attesting Officer*    *Acting Director of the United States Patent and Trademark Office*